Aug. 2, 1966 J. E. KRYNSKI 3,263,816

FILTER

Filed July 30, 1962 2 Sheets-Sheet 1

INVENTOR.
JOHN E. KRYNSKI
BY
Robertson & Smythe
ATTORNEYS.

Aug. 2, 1966 J. E. KRYNSKI 3,263,816

FILTER

Filed July 30, 1962 2 Sheets-Sheet 2

INVENTOR
JOHN E. KRYNSKI
BY
Robertson, Smythe & Bryan
ATTORNEY

United States Patent Office 3,263,816

Patented August 2, 1966

3,263,816

FILTER

John E. Krynski, East Moline, Ill., assignor to Ametek, Inc., New York, N.Y., a corporation of Delaware Filed July 30, 1962, Ser. No. 213,306

2 Claims. (Cl. 210—386)

The present invention relates to filters and particularly to a new and improved drum type filter having the capability of operating as a precoat, string, cloth or blowback scraper discharge filter.

It is customary in the drum type filtering art to provide a drum filter either as a string or a belt filter on the one hand, and to provide a separate drum filter as a precoat filter on the other hand.

The principal object of the present invention is to provide a drum filter having the capability of being used with facility as a string discharge, a belt discharge, a precoat or a blowback scraper discharge filter without requiring major alteration of the apparatus.

Another object of the invention is to provide such a drum filter in which a scraping knife for use with the drum when operated as a precoat filter has the capability of being moved to a retracted position so as not to interfere with the strings when the filter is converted to a string discharge filter.

Still another object of the invention is to provide such a drum filter in which the scraping knife may be moved to a point adjacent the drum when said filter is employed as a cloth discharge filter and such that the cloth belt passes over the knife without interference therefrom.

Still another object of the invention is to provide a drum filter in which alternate arrangements of idler rolls may be provided for alternate cloth discharge arrangements.

A still further object of the invention is to provide such a drum filter in which certain of the idle rolls may be retracted when the filter is employed as a precoat filter.

In one aspect of the invention, a drum filter may comprise a cylindrical drum mounted for rotation about a horizontal axis. The drum may be of conventional form including a peripheral surface covering upon which a filter cake can build as the drum rotates in a slurry to be filtered while at least the interior of that portion of the drum submerged in said slurry is subjected to a negative pressure drawing the filtrate through the filtering medium on the peripheral surface of the drum.

In another aspect of the invention, a scraper knife may be provided for movement into cooperating position relative to the surface of the drum when the apparatus is operated as a precoat filter.

In still another aspect of the invention, idle rolls may be arranged in such fashion that strings may be provided about a portion of the drum and over certain of the idle rolls when the apparatus is operated as a string discharge filter.

In still another aspect of the invention, other idle rolls may be arranged for receiving a cloth filtering belt when the apparatus is to be operated as a cloth discharge filter.

In still another aspect of the invention, the scraper may be mounted for movement to an advanced position for cooperation with the drum when the apparatus is used as a precoat filter, and also in an advanced position when the apparatus is used as a cloth discharge filter.

In still another aspect of the invention, the knife is adapted to be moved to a retracted position when the apparatus is used as a string discharge filter.

The above, other objects and novel features of the invention will become apparent from the following specification and accompanying drawing which is merely exemplary.

Figure 1:
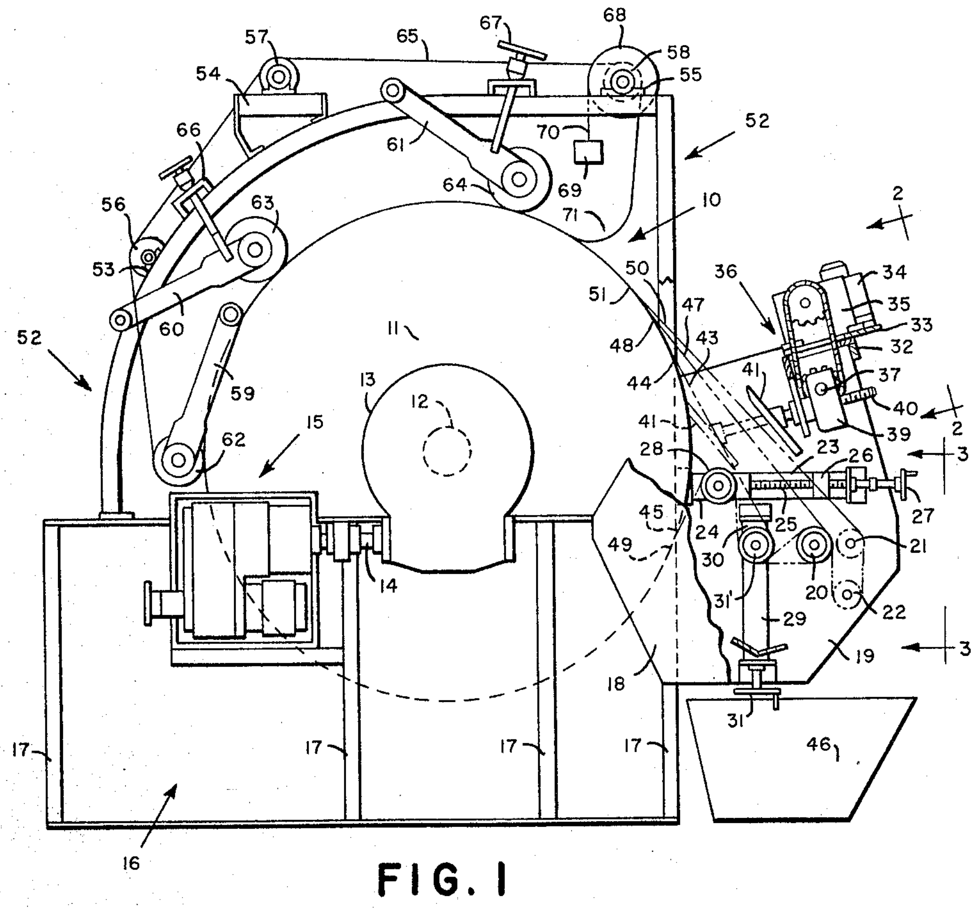
FIG. 1 is an elevational view of a drum filter to which the principles of the invention have been applied.
Figure 2:
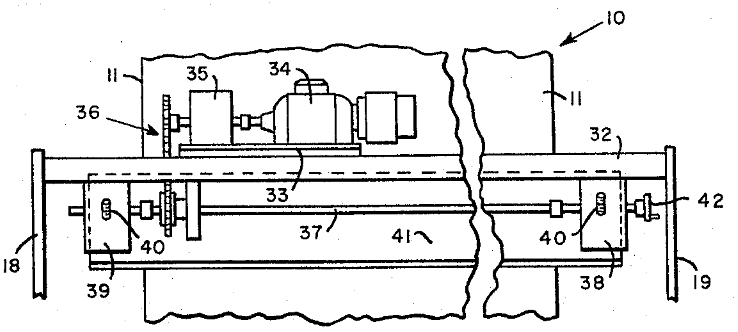
FIG. 2 is a view looking in the direction of the arrows along line 2—2 of FIG. 1.
Figure 3:
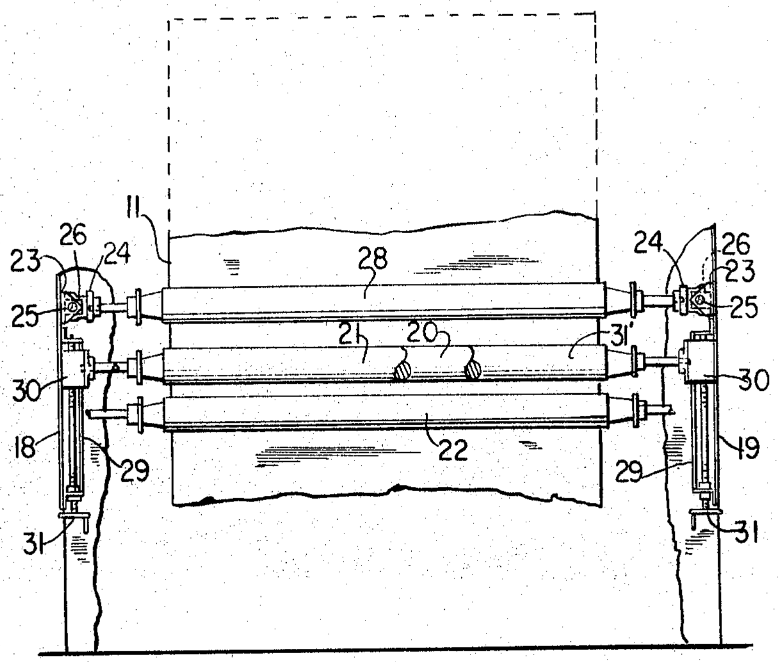
FIG. 3 is a partial end view to illustrate the rolls taken in the direction of the arrows along line 3—3 of FIG. 1.

Referring to the drawing, the principles of the invention are shown as applied to a drum filter including a cylindrical drum 10 having imperforate end walls 11 from which trunnions 12 extend that are journaled in bearings (not shown) for rotation about a horizontal axis. A worm gear mounted within a housing 13 may be driven by a worm that is connected to a drive shaft 14 that is driven by a variable speed transmission 15.

The drum 10 may be of conventional construction including a perforate peripheral surface that may be covered with a filtering medium upon which a filter cake may be formed.

The lower portion of drum 10 may be submerged within a slurry to be filtered within a tank 16, and the housing 13 and transmission 15 may be supported on brackets attached to a frame 17 surrounding the tank 16.

Parallel plates 18 and 19 may be fixed to the frame 17 at each end of the drum 10, and idle rolls 20, 21 and 22 may be journaled in aligned bearings on plates 18 and 19. Aligned, horizontal way bearings 23 on plates 18 and 19 may support bearings 24 for sliding movement therealong, and a threaded shaft 25 threaded into a fixed nut 26 along way bearing 23 acts to move bearing 24 when the threaded shaft 25 is rotated by the rotation of a handwheel 27. The bearings 24 in the ways 23 on plates 18 and 19 may journal a roll 28 for a purpose to be described later.

Other aligned vertical way bearings 29 on plates 18 and 19 may support bearings 30 for sliding movement therein when a handwheel 31 is rotated, all for a purpose to be described later. A roll 31' may be journaled in the bearings 30 for a purpose hereinafter described.

The plates 18 and 19 may also support an angle member 32 to which a platform 33 may be fixed for the mounting of a reversible motor 34 and gear reduction unit 35. The output shaft of unit 35 may drive a chain and sprocket drive 36 that drives a shaft 37. The shaft 37 may extend beyond the ends 11 of drum 10 and be connected to worm gears within gear boxes 38 and 39. The worm gears may rotate non-axially movable worm nuts threaded onto screws 40. The forward end of each screw 40 may be journaled in bearings in opposite ends of a scraping blade 41.

The construction and arrangement are such that energizing motor 34 to rotate in one direction advances the scraping blade to its dotted line position, and reverse rotation of motor 34 retracts blade 41 to its solid line position. Suitable limit switches may be provided for limiting the extent of blade motion in either direction. A handwheel 42 may be attached to shaft 37 for manually operating blade 41.

When the apparatus is to be employed as a string dicharge filter, closely spaced, continuous strings 43 may partially surround the drum 10, leaving it tangentially at a point 44, passing over the roll 31', thence over roll 28 and back onto drum 10 tangentially at a point 45. The scraper blade 41 is moved to its completely retracted position (solid line position) either manually by rotating handwheel 42 or by effecting rotation of motor 34 in the correct direction. As the strings pass beneath the roll 31', the cake thereon breaks off, falling into a hopper 46.

When the apparatus is employed as a cloth discharge filter, a cloth filter belt 47 may partially surround the drum 10, leaving it tangentially at point 48, passing over roll 20, thence around pulley or roll 31', over roll 28 and back onto drum 10 tangentially at point 49. As the belt 47 passes over roll 20, the cake thereon breaks off and falls into hopper 46. Alternatively, a cloth belt 50 may partially surround drum 10, leaving it at point 51, passing over rolls 21 and 22, thence over roll 20, under roll 31', over roll 28 and back onto drum 10 at point 45. In this latter instance, as belt 50 passes over rolls 21, 22, the cake thereon breaks off, falling into hopper 46. When the apparatus is used as a cloth discharge filter, the scraping blade 41 is moved to its advanced position (dot and dash line position) between belt 47 and the periphery of drum 10 but not in contact with the latter.

When the apparatus is employed as a precoat filter, the strings 43 and belts 47 and 50 are dispensed with, and roll 28 is retracted by the rotation of handwheels 27. The scraping blade 41 is moved to its advanced position (dot and dash line position) so as to remove the cake formed on the periphery of drum 10 without disturbing the precoat thereon. As the scraper removes the cake from drum 10, it falls into hopper 46.

The frame 17 may support a superstructure 52 on which may be mounted brackets 53, 54 and 55 supporting bearings that journal idle rolls 56, 57 and 58. Additionally, arms 59, 60 and 61 may be pivotally supported from superstructure 52, and they may support rolls 62, 63 and 64, respectively. A continuous cloth belt 65 may extend around rolls 56, 57, 58, 62, 63 and 64 in such fashion that a substantial portion thereof contacts a substantial portion of the periphery of the drum 10. Adjusting devices 66 and 67 may be provided for varying the tension of belt 65 in contact with drums 10, thereby causing said belt to act as a cake compressing or dewatering means. A brake pulley 68 may be fixed to roll 58, and a weight 69 may be attached to a stationary belt 70 partially surrounding pulley 68, said weight acting to retard the counterclockwise movement of roll 58, thus developing a loop 71 in belt 65.

By leaving the scraping blade 41 close to the peripheral surface of the drum, and employing an air blowback, the filter cloth would billow toward the scraper blade 41 and the cake thereon would be removed.

From the foregoing it is evident that the drum filter may be employed with a string discharge, alternate cloth discharges, blowback discharge or as a precoat filter, all without requiring substantial change in the basic filter apparatus.

Although the various features of the filter have been shown and described in detail to fully disclose one embodiment of the invention, it will be evident that changes may be made in such details and certain features may be used without others without departing from the principles of the invention.

What is claimed is:

1. In a filter, a frame; an open top tank mounted within said frame and adapted to contain a slurry to be filtered; a drum mounted for rotation about a horizontal axis and such that a substantial portion thereof passes downwardly through said slurry; parallel plates mounted on said frame at opposite ends of said drum; separate aligned horizontal and vertical way bearings on said plates; roll means journalled in aligned bearings in corresponding ones of said way bearings and adapted to be moved a substantial distance therein whereby said roll means may be variably positioned relative to said drum; other roll means journalled in aligned bearings on said plates in parallel relation to said first-mentioned roll means; scraper blade means mounted between said plates; and means for moving said scraper means in scraping position relative to said drum and a substantial distance away from the periphery of said drum, whereby the variable positionability of said first-mentioned roll means and scraper blade means allows said filter to be operated as a precoat filter, a string discharge filter or a cloth discharge filter.

2. The filter of claim 1 including a superstructure mounted on said frame; and belt means adapted to cooperate with the periphery of said drum for compressing and dewatering the cake that forms thereon.

References Cited by the Examiner

UNITED STATES PATENTS

| | | | |
|---|---|---|---|
| 622,561 | 4/1899 | Stream | 210—401 X |
| 1,825,295 | 9/1931 | Wright et al. | 210—396 X |
| 2,076,611 | 4/1937 | Barnebl | 210—396 |
| 2,243,311 | 5/1941 | Ditzen | 210—396 |
| 2,359,753 | 10/1944 | Devine et al. | 210—386 |
| 2,652,928 | 9/1953 | Komline | 210—401 |
| 2,867,330 | 1/1959 | Schepman | 210—400 X |
| 3,075,647 | 1/1963 | Davis | 210—401 |

REUBEN FRIEDMAN, *Primary Examiner.*

HERBERT L. MARTIN, *Examiner.*

S. ZAHARNA, *Assistant Examiner.*